United States Patent
Kompalli et al.

(10) Patent No.: US 8,681,129 B2
(45) Date of Patent: Mar. 25, 2014

(54) ASSOCIATING AUXILIARY DATA WITH DIGITAL INK

(75) Inventors: Suryaprakash Kompalli, Amherst, NY (US); Balaji Raghavan, West Lafayette, IN (US); Sriganesh Madhvanath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1255 days.

(21) Appl. No.: 12/200,942

(22) Filed: Aug. 29, 2008

(65) Prior Publication Data

US 2009/0120694 A1    May 14, 2009

Related U.S. Application Data

(60) Provisional application No. 60/987,103, filed on Nov. 12, 2007.

(51) Int. Cl.
*G06F 3/033* (2013.01)

(52) U.S. Cl.
USPC .......................................... 345/179; 382/276

(58) Field of Classification Search
USPC .......... 345/156–184; 382/181–208, 232–308, 382/312, 100
See application file for complete search history.

(56) References Cited

U.S. PATENT DOCUMENTS

| | | | |
|---|---|---|---|
| 5,042,971 A | 8/1991 | Ambrose | |
| 5,659,726 A * | 8/1997 | Sandford et al. | 1/1 |
| 5,761,305 A * | 6/1998 | Vanstone et al. | 713/171 |
| 6,208,746 B1 | 3/2001 | Musgrave | |
| 6,318,856 B1 | 11/2001 | Sansone | |
| 6,330,672 B1 | 12/2001 | Shur | |
| 6,580,819 B1 | 6/2003 | Rhoads | |
| 6,850,228 B1 * | 2/2005 | Parks et al. | 345/173 |
| 2001/0022848 A1 * | 9/2001 | Rhoads | 382/100 |
| 2002/0025067 A1 * | 2/2002 | Tomaru | 382/162 |
| 2003/0147547 A1 * | 8/2003 | Lin et al. | 382/100 |
| 2003/0179201 A1 | 9/2003 | Thacker | |
| 2003/0191951 A1 * | 10/2003 | Cross | 713/189 |
| 2004/0034602 A1 * | 2/2004 | Rubin et al. | 705/57 |
| 2004/0091111 A1 | 5/2004 | Levy et al. | |
| 2004/0120404 A1 | 6/2004 | Sugahara et al. | |
| 2005/0025355 A1 * | 2/2005 | Simard et al. | 382/159 |
| 2005/0114773 A1 | 5/2005 | Thacker | |
| 2005/0169499 A1 * | 8/2005 | Rodriguez et al. | 382/100 |
| 2005/0286771 A1 | 12/2005 | Bishop et al. | |
| 2006/0010368 A1 | 1/2006 | Kashi | |
| 2006/0050969 A1 | 3/2006 | Shilman et al. | |
| 2006/0098871 A1 | 5/2006 | Szummer | |
| 2006/0274948 A1 * | 12/2006 | Wamg et al. | 382/202 |
| 2007/0115336 A1 | 5/2007 | Ko et al. | |
| 2007/0188445 A1 | 8/2007 | Silverstein et al. | |

FOREIGN PATENT DOCUMENTS

WO    WO03/098540    11/2003

* cited by examiner

*Primary Examiner* — Liliana Cerullo

(57) ABSTRACT

A method of associating auxiliary data with a digital ink stream comprises capturing a sequence of samples representing a digital ink stream and modifying the sample information, or inserting a plurality of new samples into the sample sequence, the modified or new samples representing auxiliary data. New samples are inserted in between existing samples and are essentially imperceptible to a person viewing the digital ink image, while an authorised recipient can extract the auxiliary data.

18 Claims, 4 Drawing Sheets

ASSOCIATING AUXILIARY DATA WITH DIGITAL INK

CROSS-REFERENCE TO RELATED APPLICATIONS

This Utility patent application is based on and claims the benefit of U.S. Provisional Application No. 60/987,103, filed on Nov. 12, 2007, the contents of which are hereby incorporated by reference in their entirety.

BACKGROUND

Digitizers, or devices that capture a user's handwriting, are well known. For example, a digitizer captures the trajectory of a pen as it moves, and the resulting data is commonly referred to as digital ink.

It can be useful to send auxiliary information along with the digital ink. Examples of such auxiliary information include location and time of writing, identification of the sender, information about the device used to capture the handwriting, as well as the results of interpreting the handwriting.

Given that such auxiliary information may be used to ensure authenticity or integrity of the digital ink, it may be necessary to ensure that the auxiliary information is only accessible to authorized recipients and that it is difficult to manipulate or doctor the auxiliary information, while maintaining the ability of those who do not need the auxiliary information to access and render the digital ink, preferably using generic, rather than proprietary, ink-viewing applications.

BRIEF DESCRIPTION OF THE DRAWINGS

Embodiments of the invention will now be described, by way of example, with reference to the accompanying drawings, in which.

DETAILED DESCRIPTION

Figure 1:
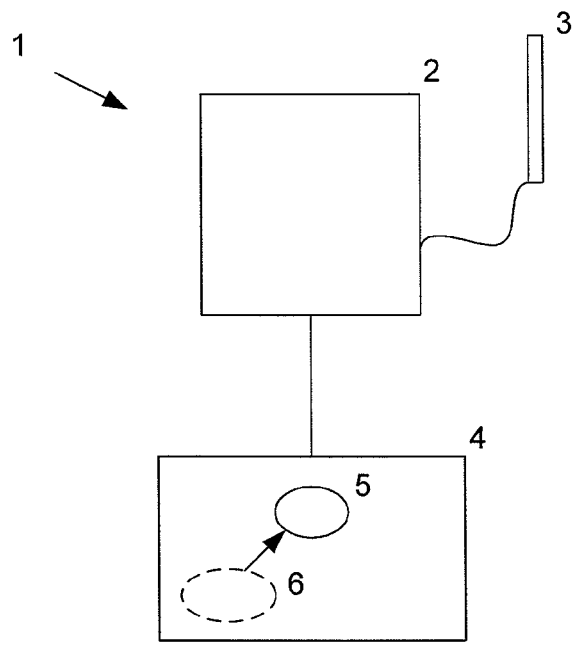
FIG. 1 illustrates a digital ink system according to an embodiment of the invention.

Referring to FIG. 1, a system according to an embodiment of the invention comprises a digitizer 1, comprising a digitizer pad 2, a stylus 3 and a processor 4. An application program 5 running on the processor implements a method according to the invention, as will now be described in more detail. A generic source of auxiliary data 6 is also shown, as will be explained in more detail below.

Digitizer systems are well known, and their overall functionality and implementation will therefore not be described in detail, but would be apparent to a person skilled in the art.

Figure 2:
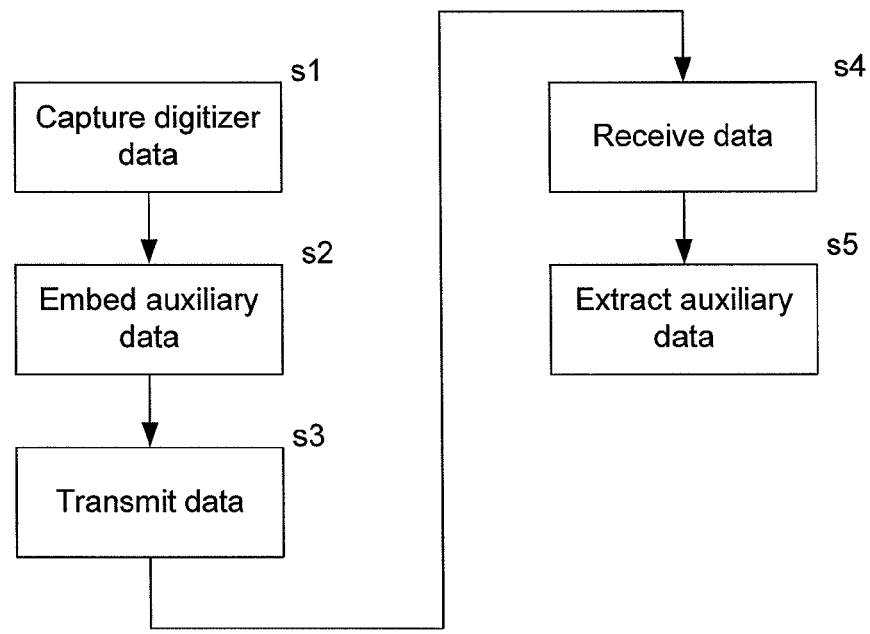
FIG. 2 is a flowchart illustrating a method of embedding auxiliary data into, and extracting auxiliary data from, digital ink according to an embodiment of the invention.

FIG. 2 illustrates the overall process according to the invention. Handwriting data from a digitizer is first captured (step s1). Auxiliary data is then embedded in the captured handwriting data (step s2). The resulting data is then transmitted between devices (step s3).

At the receiver, the ink data with embedded auxiliary data is received (step s4), and the auxiliary data extracted from the ink data (step s5).

The method according to the invention will now be described in more detail with reference to FIG. 3.

An output from a digitizer according to an embodiment of the invention is assumed to be in the form of a sequence of samples, also referred to herein as pixels, containing X, Y coordinates in time order, with pen up and down commands to indicate when writing stops and starts, as shown below:

601 657
601 676
. . .
504 872
.PEN_UP
.PEN_DOWN
1459 754
. . .
1198 729

It will be understood by the skilled person that digitizers can capture a wide variety of data as handwriting data, including stylus pressure, velocity, inclination and so on.

Many different methods are available to provide different kinds of auxiliary data. For example, time of writing can be generated within a digitizer using an in-built clock, or a received clock signal. Location can be generated using, for example, a GPS mechanism. For the purposes of this application, it is assumed that a source 6 of auxiliary data is available.

Figure 3:
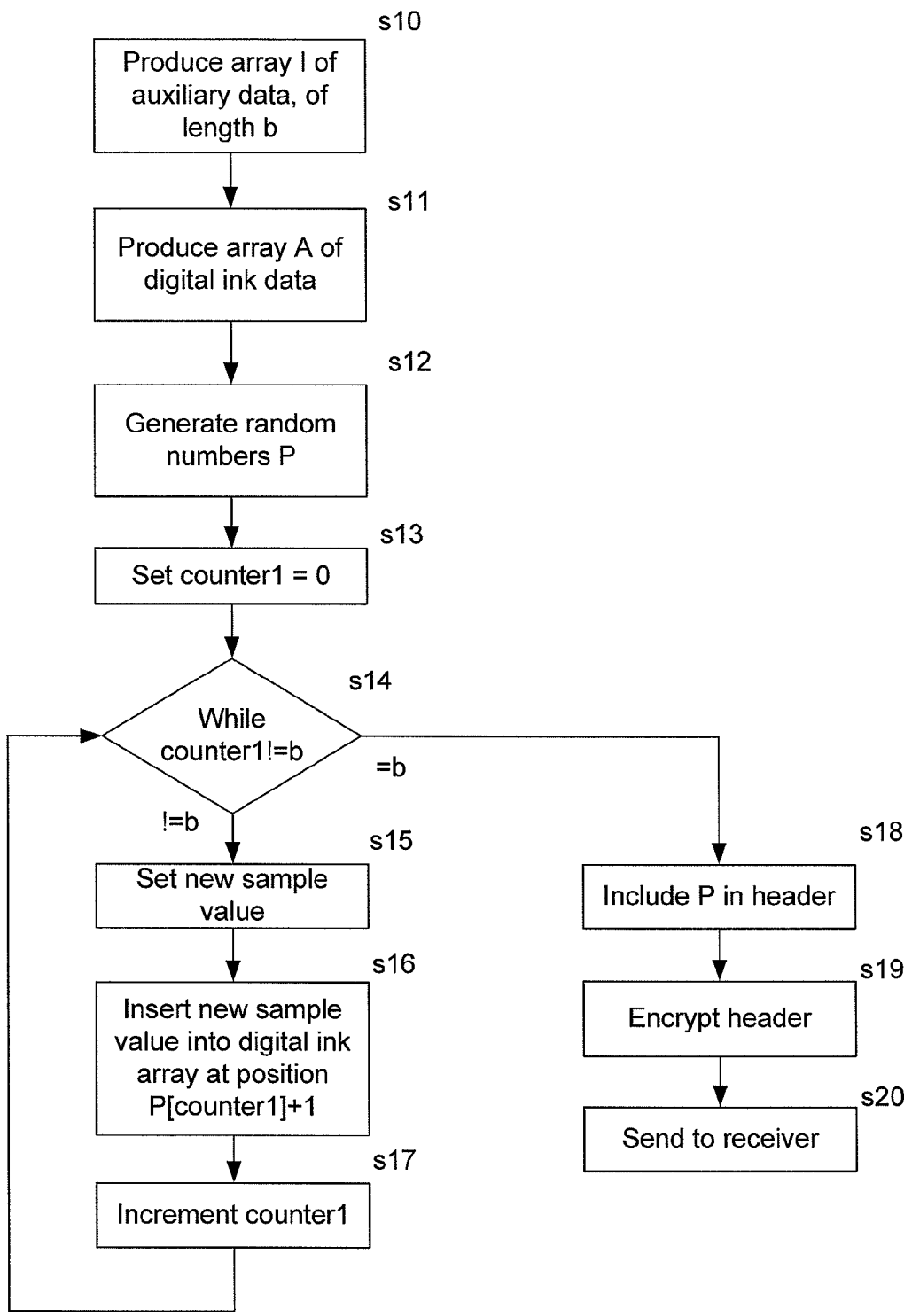
FIG. 3 is a flowchart illustrating in more detail the process of embedding auxiliary data into a digital ink stream.

Referring to FIG. 3, the auxiliary data is converted into the form of an array I (I[0] to I[b−1]), of length 'b' (step s10). The digital ink stream is also organized into the form of an array A (A[0] to A[k−1]), having 'k' samples (step s11). A random number generator is used to create a set of 'b' non-negative integers P(P[0] to P[b−1]), each number being between 0, and k minus 2, (k−2) (step s12). The integers P are used as indices into the array A. Where, in accordance with the algorithm below, new samples are added into the array A, the upper bound for each successive integer in the array P can be increased by 1. So P[0] can be between 0, and k−2,, P[1] between 0, and k−1, and so on.

A variable counter1 is set to 0, (step s13). A loop is then executed (steps s14 to s17), consisting of the following steps, written as pseudo-code, which will be explained in more detail below:

while counter 1!=b
set new_, sample=floor((A[P[counter1]]+A[P[counter1]+1])/2)+
I[counter1]
insert new_, sample into array A at position A[P[counter1]+1]
increment counter1

The loop is executed until counter1 is equal to b. The indices P are then included in a header H (step s18). Using a known public-private key encryption scheme, the public key of the intended receiver is used to encrypt the header H (step s19).

The encrypted header is sent to the intended receiver (step s20).

It will be understood by the skilled person that the use of encryption is only necessary to add security when transmitting the indices to the receiver, since anyone intercepting the indices could use them to extract the auxiliary information from the digital ink. In alternative embodiments, the indices could be transmitted in any other secure way.

In further alternative embodiments, the auxiliary data can be encrypted before starting the embedding process. The auxiliary data can even be double encrypted using the sender's private key followed by the receiver's public key, so that the receiver can be sure that the data was embedded by the sender.

An alternative method of combining both the ink and the header to transmit the auxiliary data would be to hash the ink data and encrypt the authentication information along with the hash using the receiver's public key. This can then be added as a header to the ink data. A disadvantage of this approach is that two copies of the ink data are kept in one file: one copy in the form of ink samples and a second copy in the form of a hash. This increases the size of the ink file.

The operation of the pseudo-code fragment set out above will be explained in more detail below, with reference to an example.

Assume that k=1000, and b=10,, in other words that there are a thousand samples in the digital ink stream and that there are ten elements of auxiliary information, or meta-data, to be inserted. In this example, it is assumed that the array I is two dimensional, so that information is present in the form of X, Y coordinates. However, in an alternative example, the array I could be one or multi-dimensional. For example if pen/stylus pressure is considered in addition to X, Y coordinates, the array may be three dimensional. It is also envisaged that the auxiliary information could be in any form that is capable of being embedded in the digital ink stream.

The ink coordinates therefore form an array A[0] to A[999] and we have a set of 10, random positive integers P[0] to P[9], each being between 0, and 998.

Assume that:
P[0]=997;
A[996]=(4245, 1375);
A[997]=(4254, 1380);
A[998]=(4260, 1386);
A[999]=(4263, 1395); and
I[0]=(1, 0)

Then new_, sample=floor(((4254, 1380)+(4260, 1386))/2)+(1, 0)

$$\text{So new\_sample} = \text{floor}((8514, 2766)/2) + (1, 0) \quad \text{(step s15)}$$
$$= (4257, 1383) + (1, 0)$$
$$= (4258, 1383)$$

So the new sample (4258, 1383) is inserted into the array at position A[998] (step s16), and the existing sample at A[998] is now referenced by A[999].

This means that the sample array has now changed to:
A[996]=(4245, 1375);
A[997]=(4254, 1380);
A[998]=(4258, 1383);
A[999]=(4260, 1386);
A[1000]=(4263, 1395).

Figure 4A:
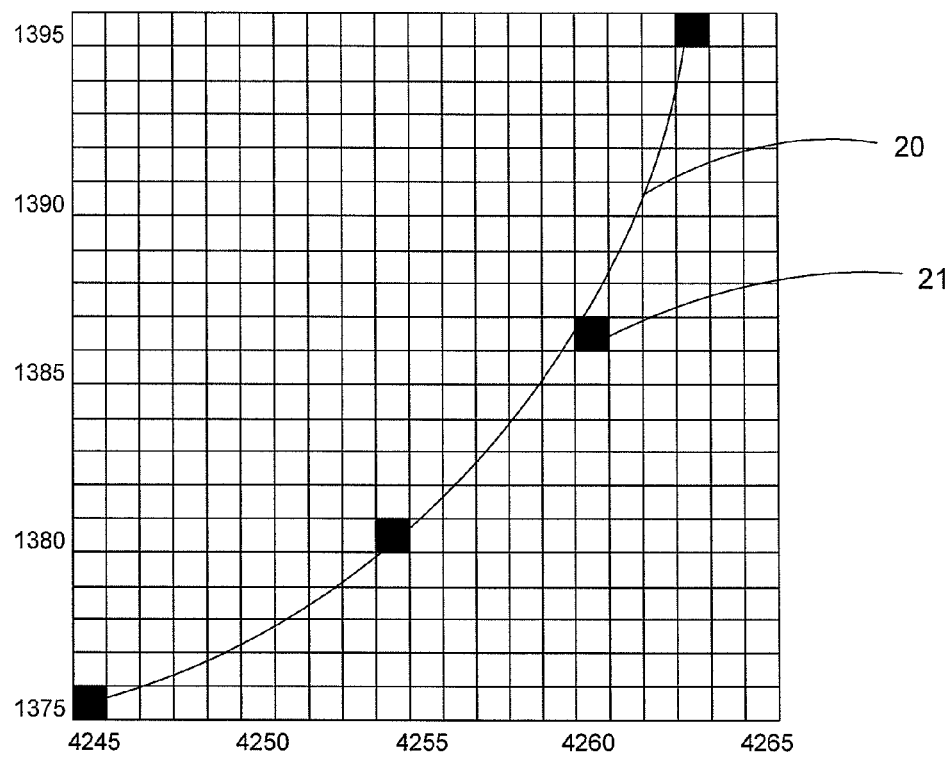
FIG. 4*a*, illustrates a line segment defined by sample coordinates.
Figure 4B:
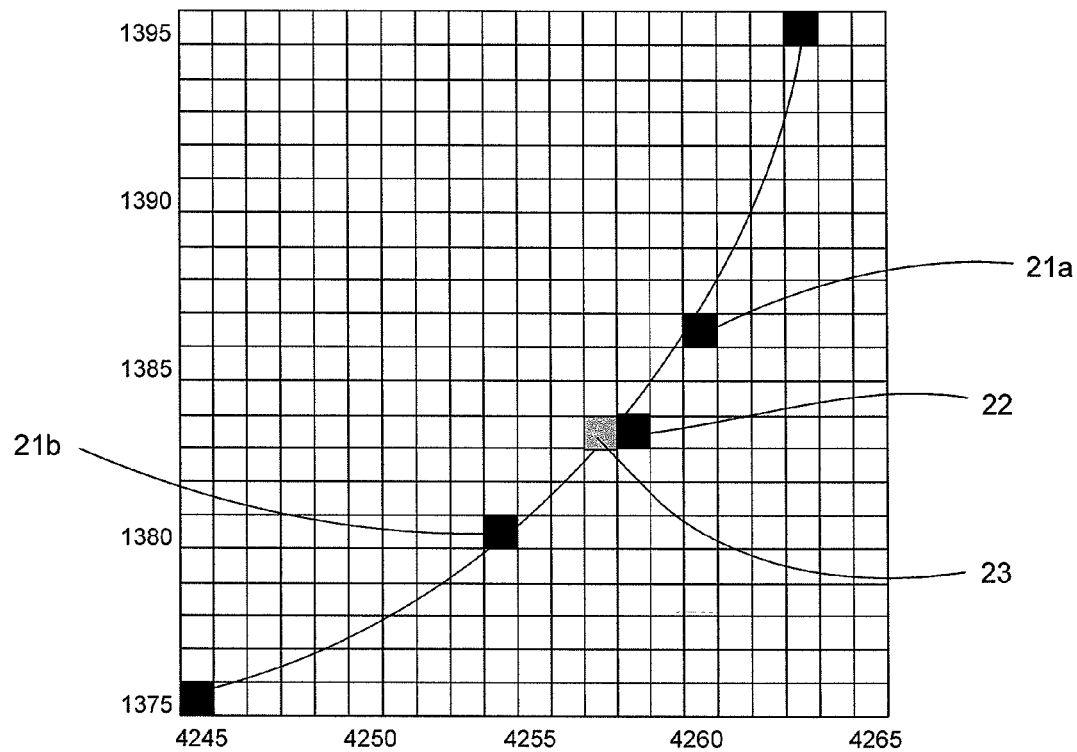
FIG. 4*b*, illustrates the line segment of FIG. 4*a*, with an additional sample representing auxiliary information.

The sample coordinates before and after the new sample has been inserted are shown schematically in FIGS. 4*a*, and 4*b*, respectively.

In FIG. 4*a*, a line segment 20 represents a portion of the handwriting of a user and the existing samples 21 captured along the line are marked as black squares.

FIG. 4*b*, illustrates the new sample 22 added between two existing samples 21*a*, 21*b*. It is apparent that when viewed in the context of the overall image, the new sample will be substantially imperceptible.

If the value of I[0] had been (0, 0) rather than (1, 0), then the new sample would have been added at coordinates (4257, 1383), as illustrated as sample 23 in FIG. 4*b*. In this embodiment, different auxiliary information is therefore encoded using a very small shift in sample positions.

Figure 5:
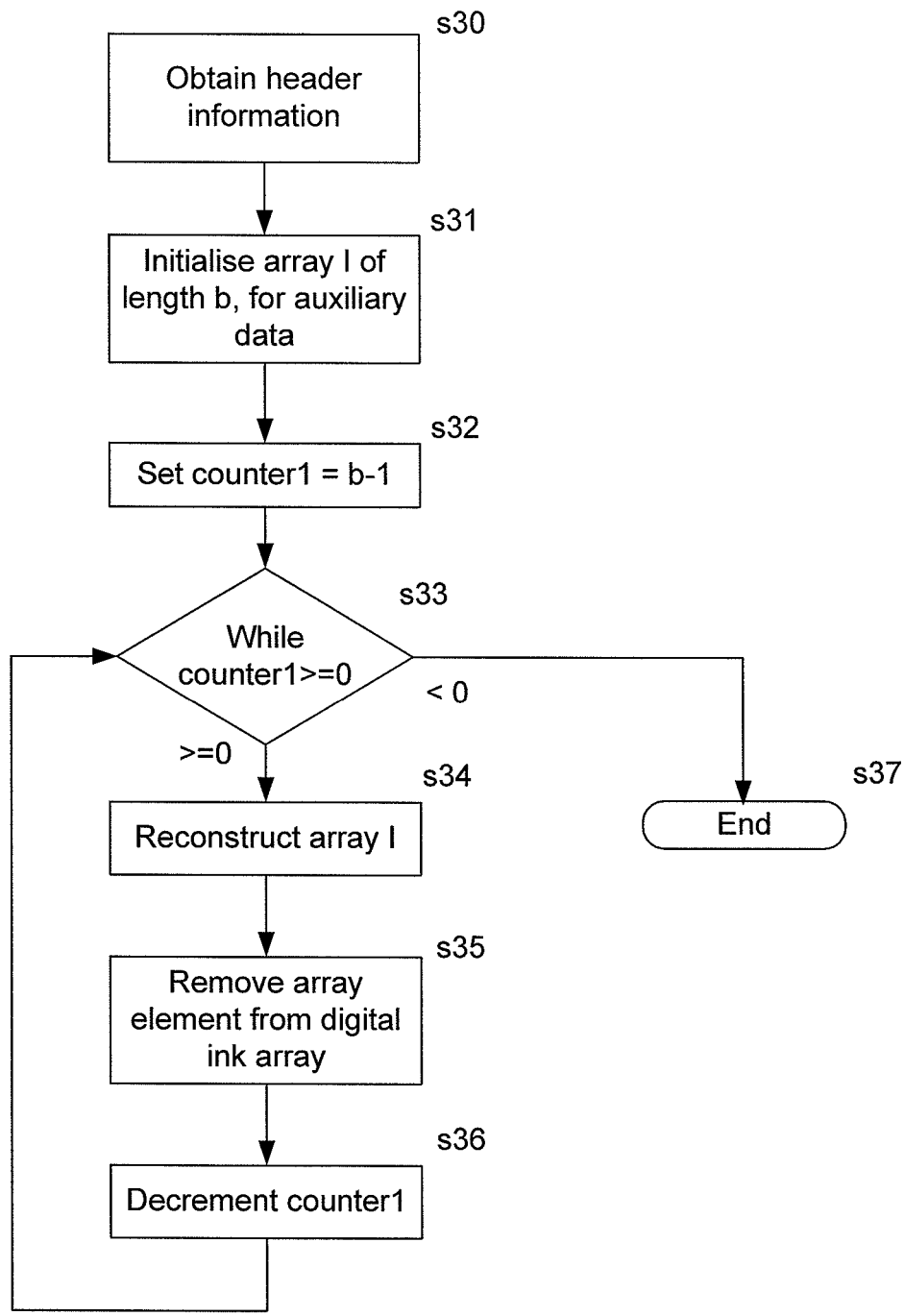
FIG. 5 is a flowchart illustrating in more detail the process of extracting auxiliary data from a digital ink stream.

FIG. 5 illustrates the steps carried out at the receiver to retrieve the auxiliary data from a received ink stream.

The receiver first obtains the header information, for example by decrypting the header using the receiver's private key (step s30).

The header information informs the receiver of the number of stored data elements b and the sequence of random indices P.

An array I is initialised to store b data elements (step s31). A counter counter1 is set to the value b minus 1, (b−1) (step s32).

The following loop is then executed (steps s33 to s36):
While counter1≥=0
 I[counter1]=A[P[counter1]+1]−floor((A[P[counter1]]+A[P[counter1]+2])/2)
 remove the array element A[P[counter1]+1] from the array A
 decrement counter1

Once counter1 is less than 0, the array I contains the auxiliary data embedded by the sender and the process ends (step s37).

For example, the received digital ink stream, produced as a result of the process set out above, will contain the coordinates:
A[996]=(4245, 1375);
A[997]=(4254, 1380);
A[998]=(4258, 1383);
A[999]=(4260, 1386);
A[1000]=(4263, 1395).

When counter1=0, the pseudo-code fragment above carries out the operation to reconstruct element I(0) of the array I (step s34):
 I[0]=A[P[0]+1]−floor((A[P[0]]+A[P[0]+2])/2)
From the received header, P[0]=997. So
 I[0]=A[998]−floor((A[997]+A[999])/2)
 And I[0]=(4258, 1383)−floor(((4254, 1380)+(4260, 1386))/2)
So I[0]=(4258, 1383)−floor((8514, 2766)/2)
And I[0]=(4258, 1383)−(4257, 1383)
So I[0]=(1, 0), recovering the original meta-data.

Array element A[998] is then removed from the array A (step s35).

The process (steps s33 to s36) is of course repeated for all values of b to reconstruct the entire array I.

The skilled person would understand that the embodiments described above are merely exemplary, and that there would be many other ways of inserting new samples into the digital data stream in a way that is essentially imperceptible to someone viewing the resulting digital image. This potentially includes any scheme that provides extra samples for a fixed number of input handwriting samples.

The interpolation technique described above is a simplified form of a subdivision curve algorithm that enables the creation of new samples from existing samples. Many variants of such techniques are known and would be applicable to create the new samples of the present invention. For example, suitable interpolation schemes include cubic polynomial interpolation and Lagrange interpolation.

Furthermore, while the specific algorithm described is based on insertion between two adjacent samples, the insertion could be based on an offset from the position of a single sample, for example by incrementing or decrementing the current sample position and inserting the new sample at this point.

More generally, the method according to the invention covers selecting a set of locations in the digital ink where auxiliary data is to be added and generating perturbed coordinates from existing ink coordinates. The locations can be chosen based on random numbers, numerical sequences such as Fibonacci sequences, or by other techniques. The information that provides the locations is added as a header and transmitted along with the ink. Public key encryption is added for security.

Perturbation techniques include imperceptibly modifying the original data points, introducing duplicate points that would be automatically ignored by an ink rendering application at the time of rendering and encoding the information using a similar scheme, but in a different digitizer channel, for example, channels carrying pressure, pen tilt or other ink parameter information. In this last case, the other parameter information could be altered for existing data points or for newly inserted data points, for example by altering pressure or pen tilt information at a selected sample.

It will also be appreciated that the various schemes described herein can be interchangeably combined. For example, it would be possible to alter one or both x, y coordinates, in addition to altering one or more ink parameters.

Further embodiments are set out below to explain how the original samples can be modified, instead of adding new samples.

For example, 'b' indices are randomly picked from the original data and the corresponding (x, y) coordinate values are perturbed, so that x or y or x+y are even if an auxiliary data bit value is '0' and odd if the bit is '1', or vice versa.

Alternatively, 'b' consecutive indices could be selected starting from some index 's', so that only 's' and 'b' need to be stored. Yet further, 'b' non-consecutive indices could be selected, starting from 's', such that the interval between them is determined by a predetermined sequence, such as a fixed interval, a Fibonacci sequence, the digits of PI, and so on. In this case, a coding for the interval would also be stored, such as "1" for consecutive, "2" for Fibonacci and so on.

In essence, any algorithm can potentially be used which provides the result that the auxiliary data is not perceptible to someone viewing the ink, but which allows an authorized user to reliably extract the auxiliary data from the digital ink stream.

The invention claimed is:

1. A method of associating auxiliary data with a digital ink stream, comprising:
   providing a sequence of samples of digital ink data;
   associating auxiliary data with the digital ink data;
   generating random numbers, wherein each of the random numbers represents a random position in the sequence of samples;
   creating new samples from the auxiliary data, wherein each of the new samples is created based on information of an element of the auxiliary data and multiple samples at one of the random positions in the sequence of samples; and
   inserting, by a processor, the new samples into the sequence of samples at the randomly generated positions.

2. A method according to claim 1, wherein the information associated with at least one of the samples comprises sample coordinates.

3. A method according to claim 1, wherein each of the new samples is inserted in between neighboring samples in the sequence of samples.

4. A method according to claim 1, wherein the position of each of the plurality of new samples represents an element of the auxiliary data.

5. A method according to claim 1, wherein each of the randomly generated numbers is a number between 0 and k−2, wherein k is a total number of samples in the sequence of samples of the digital ink data.

6. A method according to claim 5, comprising transmitting the random positions in the sequence of samples represented by the randomly generated numbers to a receiver.

7. A method according to claim 6, comprising encrypting the randomly generated positions prior to transmission.

8. A method according to claim 7, wherein the randomly generated positions are transmitted to the receiver as a header, together with the digital ink data.

9. A method according to claim 1, comprising modifying the information associated with at least one of the samples to associate the auxiliary data with the samples in the sequence of samples.

10. A method according to claim 9, wherein the digital ink data is generated using a pen on a surface, and wherein modifying the information comprises modifying at least one of a group comprising sample coordinates, pen pressure in relation to the surface, pen speed, and pen angle in relation to the surface.

11. Apparatus for associating auxiliary data with digital ink data, comprising:
    a processor to:
       provide a sequence of samples of digital ink data;
       associate auxiliary data with the digital ink data;
       generate random numbers, wherein each of the random numbers represents a random position in the sequence of samples;
       create new samples from the auxiliary data, wherein each of the new samples is created based on information of an element of the auxiliary data and multiple samples at one of the random positions in the sequence of samples; and
       insert the new samples into the sequence of samples at the randomly generated positions.

12. Apparatus according to claim 11, wherein the information associated with at least one of the samples comprises sample coordinates.

13. Apparatus according to claim 12, further comprising a random number generator to generate the random numbers.

14. Apparatus according to claim 13, wherein each of the random positions comprises an index into an array of digital ink coordinates.

15. Apparatus according to claim 13, wherein each of the random numbers is an integer between 0 and k−2, wherein k is a total number of samples in the sequence of samples of the digital ink data.

16. Apparatus according to claim 13, further comprising an encryption system to encrypt the randomly generated positions of the new samples.

17. Apparatus according to claim 11, wherein the processor is further to modify the information associated with at least one of the samples to associate the auxiliary data with the samples in the sequence of samples.

18. Apparatus according to claim 17, wherein the digital ink data is generated using a pen on a surface, and wherein the processor is further to modify the information by modifying at least one of a group comprising sample coordinates, pen pressure in relation to the surface, pen speed, and pen angle in relation to the surface.

* * * * *